(12) United States Patent
Ruiz

(10) Patent No.: US 7,022,990 B2
(45) Date of Patent: Apr. 4, 2006

(54) DEEP CAVITY SENSOR PACKAGE

(75) Inventor: Javier Ruiz, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 410 days.

(21) Appl. No.: 10/248,602

(22) Filed: Jan. 31, 2003

(65) Prior Publication Data

US 2004/0149908 A1 Aug. 5, 2004

(51) Int. Cl.
*G01J 5/04* (2006.01)
*H01L 31/0203* (2006.01)

(52) U.S. Cl. ............... 250/338.1; 250/338.4; 257/434; 438/55

(58) Field of Classification Search ......... 250/338.3, 250/338.4, 338.1; 257/432, 433, 434; 438/55
See application file for complete search history.

(56) References Cited

U.S. PATENT DOCUMENTS

| | | | |
|---|---|---|---|
| 4,008,945 A * | 2/1977 | Scherer .................. 359/350 |
| 5,498,900 A * | 3/1996 | Dunaway et al. ......... 257/659 |
| 5,798,557 A * | 8/1998 | Salatino et al. ........... 257/416 |
| 5,818,094 A * | 10/1998 | Matsuo .................... 257/434 |
| 5,932,875 A * | 8/1999 | Chung et al. ............ 250/239 |
| 6,062,461 A | 5/2000 | Sparks et al. ........... 228/123.1 |
| 6,074,891 A | 6/2000 | Staller ...................... 438/53 |
| 6,147,389 A * | 11/2000 | Stern et al. ............... 257/434 |
| 6,670,538 B1 * | 12/2003 | Wilner et al. ............. 136/230 |
| 6,686,653 B1 * | 2/2004 | Jerominek et al. ....... 257/680 |
| 6,846,690 B1 * | 1/2005 | Farcy et al. ............... 438/48 |
| 2003/0146384 A1 | 8/2003 | Logsdon et al. ........ 250/338.1 |

* cited by examiner

*Primary Examiner*—Albert Gagliardi
(74) *Attorney, Agent, or Firm*—Stefan V. Chmielewski

(57) ABSTRACT

A hermetic package of a type used to contain a sensing element, such as an infrared sensing element. The package comprises a base having a base wall and sidewalls surrounding the base wall to define a first recess within the base. The sensing element is fabricated on a device chip disposed within the first recess. A lid is hermetically sealed with the base to enclose the sensing element. The lid defines a second recess that communicates with the first recess, such that the first and second recesses define a continuous cavity between the lid and the base and in which the device chip is contained. The depth of the second recess is preferably at least about half the depth of the sensing element within the first recess, such that neither the lid nor the base are required to have a deep recess that defines essentially the entire cavity in which the device chip is contained.

6 Claims, 1 Drawing Sheet

DEEP CAVITY SENSOR PACKAGE

BACKGROUND OF INVENTION

1. Field of the Invention

The present invention generally relates to packages for containing electronic devices. More particularly, this invention relates to a ceramic package requiring a deep cavity for enclosing an electronic device, such as an infrared sensor, wherein the package is configured to be more readily fabricated.

2. Description of the Related Art

Hermetically-sealed ceramic packages are used to enclose a variety of semiconductor sensing devices, such as infrared (thermal) sensors, yaw (angular rate) sensors, angular and linear accelerometers, pressure sensors, etc. Each of these devices typically involves one or more micromachined sensing structures or elements formed in or on a silicon chip (referred to herein as a device chip). The device chip is often placed within a protective package and then wire bonded to electrically connect the device to bond pads on the package. An example of this packaging scheme is represented in FIG. 1, which shows a device chip 10 placed within a deep cavity 14 defined entirely by a recess 16 in a ceramic base 12, and then closed by a ceramic lid 18. The device chip 10 is represented as having a diaphragm on which an infrared sensing element 20 is fabricated, such as of a type disclosed in commonly-assigned U.S. Patent Application Publication No. 2003/0146384 to Logsdon et al., U.S. Pat. No. 6,793,389 to Chavan et al., or U.S. Patent Application Publication No. 2003/0148620 to Chavan et al., though the device chip 10 could be fabricated to carry a variety of other types of sensing elements.

The sensitivity of the infrared sensing element 20 is enhanced if the cavity 14 is evacuated, necessitating that the lid 18 is hermetically sealed with the base 12. An optical lens or window 22 is provided in the lid 18 through which infrared radiation to be sensed can be transmitted into the cavity 14 and to the sensing element 20. A consideration in the fabrication of the package shown in FIG. 1 is to provide sufficient focal distance for incoming infrared radiation after passing through the window 22 in the lid 18 and before impinging the sensing element 20. However, optimizing the focal length requires a relatively deep recess 16 in the base 12, which complicates the fabrication of the base 12 and incurs additional costs.

From the above, it can be appreciated that packages required for sensing elements can add significant cost to a sensor, and that it would be desirable if the cost and complexity of such packages could be reduced, particularly for the case of infrared sensors.

SUMMARY OF INVENTION

The present invention is directed to a hermetic package of the type used to contain an electronic device, such as an infrared sensor. The package eliminates the use of a single deep cavity for enclosing the device, and is therefore configured to be more readily fabricated.

The package of this invention comprising a ceramic base chip having a base wall and sidewalls surrounding the base wall so as to define a first recess within the base chip. A device chip is disposed within the first recess and has a sensing element thereon. The sensing element is located within the first recess at a depth having a depth dimension measured in a direction normal to the base wall. A ceramic lid is hermetically sealed with the base chip to enclose the sensing element. The lid defines a second recess having a depth dimension in a direction normal to the base wall of the base chip. The second recess communicates with the first recess of the base chip such that the first and second recesses define a continuous cavity between the lid and the base chip and in which the device chip is contained. The depth dimension of the second recess is at least about half of the depth dimension of the sensing element within the first recess, such that neither the lid nor the base chip is required to have a deep cavity that defines essentially the entire cavity in which the device chip is contained. As such, the cost and complexity of fabricating the package are significantly reduced as compared to prior art hermetic packages.

Other objects and advantages of this invention will be better appreciated from the following detailed description.

DETAILED DESCRIPTION

Figure 2:
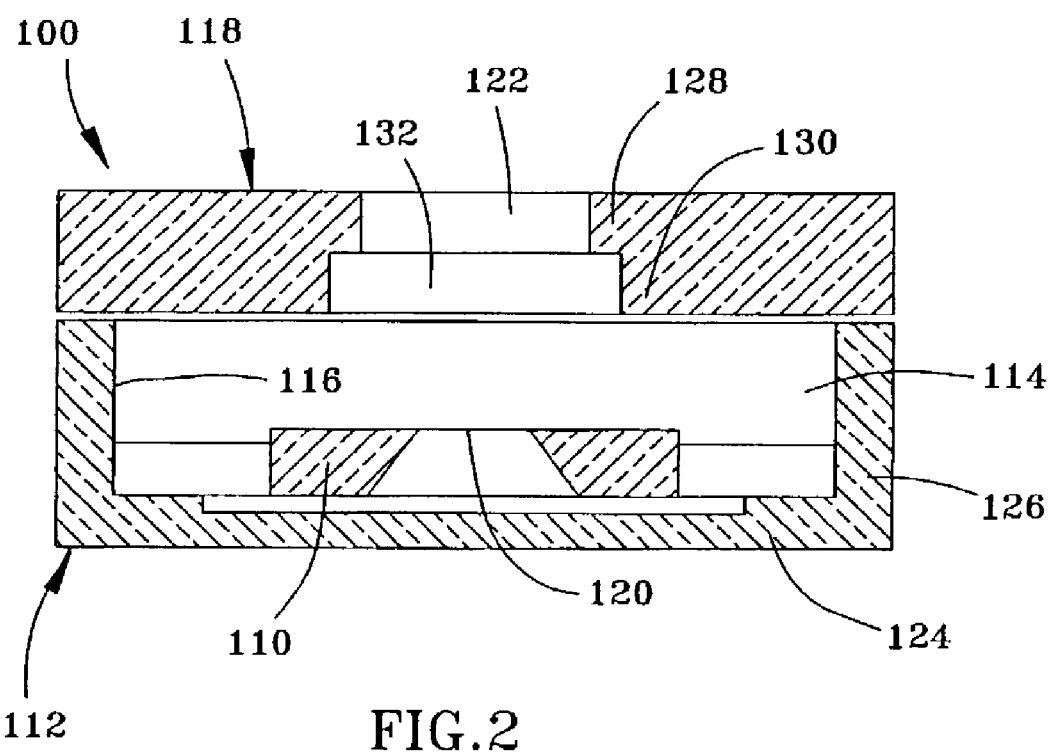
FIG. 2 is a cross-sectional view of a hermetic infrared sensing package in accordance with one embodiment of the present invention.

A hermetic package 100 is represented in FIG. 2 as having been fabricated in accordance with an embodiment of this invention. The package 100 comprises a device chip 110 bonded or otherwise attached to a base 112. A lid 118 is bonded to the base 112 to enclose, preferably hermetically, an infrared-sensing element 120 fabricated on a diaphragm that has been micromachined in the surface of the device chip 110. In accordance with known practice, an optical lens or window 122 is provided in the lid 118 through which infrared radiation is transmitted into the cavity 114 and sensed by the sensing element 120. The base 112 is preferably bonded to the lid 118 under a vacuum using any suitable technique that results in a hermetical seal between the chip 112 and lid 118, such that the sensing element 120 operates in an evacuated environment within the package 100.

While an infrared-sensing element 120 is represented in FIG. 2, the presence within the package 100 of other sensing elements is within the scope of this invention. In addition, while a diaphragm is illustrated in FIG. 2, other micromachined structures are also within the scope of this invention. The base 112 and lid 118 are preferably formed of a ceramic material, while the device chip 110 is preferably formed of monocrystallographic silicon. However, it is foreseeable that other materials could be used for the device chip 110, base 112 and lid 118, such as glass or a semiconducting material.

Figure 1:
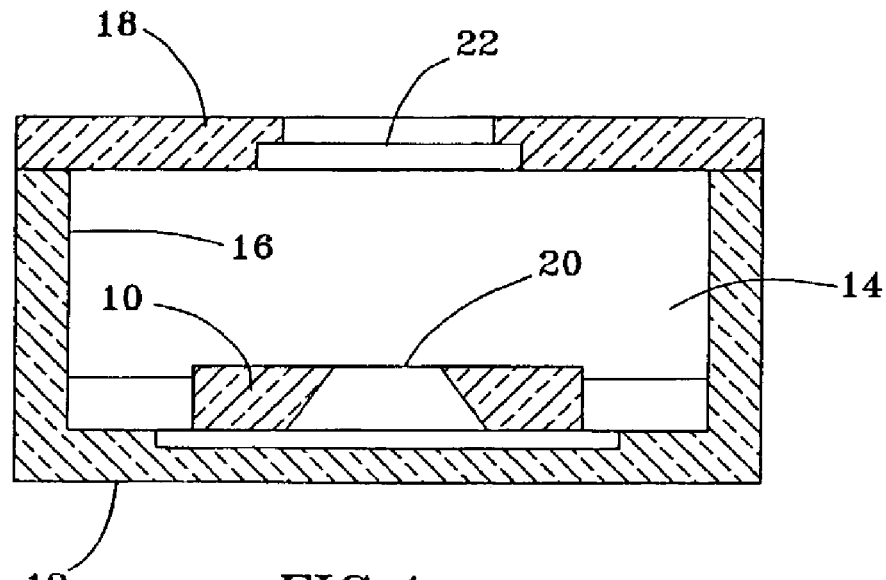
FIG. 1 is a cross-sectional view of a hermetic infrared sensing package in accordance with the prior art.

As an infrared sensor package, a consideration in the fabrication and construction of the package 100 is the sufficiency of the focal distance for incoming infrared radiation, established by the distance between the window 122 in the lid 118 and the sensing element 120 on the device chip 110. Conventional practice has been to provide a suitable focal length that is solely obtained by fabricating the base 112 to have a deep recess, as shown in FIG. 1. In contrast, the present invention encloses the sensing element 120 within a continuous, compound cavity 114 formed by a first recess 116 defined by and within the base 112, as well as a second recess 132 defined by and within the lid 118. As depicted in FIG. 2, the base 112 has a base wall 124 surrounded by sidewalls 126 to define the recess 116 of the base 112. Similarly, the lid 18 has a top wall 128 and sidewalls 130 surrounding the top wall 128 to define the recess 132 within the lid 118.

The base 112 and lid 118 are configured such that a significant portion of the focal length between the window 122 and the sensing element 120 is provided by the recess 132 of the lid 118. Stated another way, the depth of the recess 132 in the lid 118, as measured in a direction normal to the base wall 124, approaches the depth of the sensing element 120 within the recess 114, again as measured in a direction normal to the base wall 124. For example, in a base 112 and lid 118 having lateral dimensions of about five by seven millimeters, the depth of the base recess 116 above the device chip 110 may be about one millimeter, while the recess 132 within the lid 118 is about 0.5 millimeter. In a potentially preferred embodiment, these depth dimensions are roughly equal to each other, e.g., as a result of decreasing the height of the base sidewalls 126 while commensurately increasing the height of the lid sidewalls 130. In any case, neither the base 112 nor the lid 118 are individually required to have a cavity that is sufficiently deep to provide a suitable focal length, a requirement that would otherwise complicate and increase the cost of fabricating the package 100.

Another advantage of the package 100 is that the sidewalls 126 of the base 112 can be reduced in height, and are then more amenable to fabrication in layers. A comparison of FIGS. 1 and 2 evidences that reducing the height of the base sidewalls 126 yields a package 100 in which the lid 118 constitutes nearly half of the depth (thickness) dimension of the package 100. An additional benefit of reducing the height of the sidewalls 124 is that the thickness of the sidewalls 126 can be reduced without decreasing their height-to-width aspect ratio, such that the footprint of the package 100 can be reduced without compromising the structural integrity of the package 100.

While the invention has been described in terms of a preferred embodiment, it is apparent that other forms could be adopted by one skilled in the art. Accordingly, the scope of the invention is to be limited only by the following claims.

The invention claimed is:

1. A hermetic infrared sensor package comprising:
   a base having a base wall and sidewalls surrounding the base wall to define a first recess within the base, the sidewalls defining a first hermetic sealing surface surrounding the first recess;
   a device chip within the first recess, the device chip having an infrared-sensing element thereon, the infrared-sensing element being located within the first recess at a depth below the first hermetic sealing surface and having a first depth dimension from the first hermetic sealing surface in a direction normal to the base wall; and
   a lid hermetically sealed with the base, the lid comprising an infrared-transmitting window and sidewalls surrounding the window, the window and the sidewalls cooperating to define a second recess in the lid, the sidewalls of the lid defining a second hermetic sealing surface surrounding the second recess and bonded to the first hermetic sealing surface of the base, the window having a second depth dimension from the second hermetic sealing surface in a direction normal to the base wall of the base, the second recess communicating with the first recess of the base to define a continuous cavity that is defined by and between the lid and the base and contains the device chip, the second depth dimension of the second recess of the lid being at least about half of the first depth dimension of the infrared-sensing element within the first recess, the sum of the first and second depth dimensions being a focal distance of the window to the infrared-sensing element.

2. The hermetic package according to claim 1, wherein the first and second depth dimensions are approximately equal.

3. The hermetic package according to claim 1, wherein the package has a thickness in a direction parallel to the first and second depth dimensions of the lid and the base, and the lid constitutes about one-half of the thickness of the package.

4. The hermetic package according to claim 1, wherein the lid comprises a top wall and the window is in the top wall.

5. A hermetic infrared sensor package comprising:
   a ceramic base having a base wall and sidewalls surrounding the base wall to define a first recess within the base, the sidewalls defining a first hermetic sealing surface surrounding the first recess;
   a device chip supported on the base wall and within the first recess of the base, the device chip having an infrared-sensing element thereon, the infrared-sensing element being located within the first recess at a depth below the first hermetic sealing surface and having a first depth dimension from the first hermetic sealing surface in a direction normal to the base wall; and
   a ceramic lid hermetically sealed with the base, the lid having a top wall that defines an infrared-transmitting window and sidewalls surrounding the top wall to define a second recess within the lid, the sidewalls of the lid defining a second hermetic sealing surface surrounding the second recess and bonded to the first hermetic sealing surface of the base, the window having a second depth dimension from the second hermetic sealing surface in a direction normal to the top wall, the second recess communicating with the first recess of the base to define a continuous compound cavity that is defined by and between the lid and the base and contains the device chip, the second depth dimension being approximately equal to the first depth dimension, the sum of the first and second depth dimensions being a focal distance of the window to the infrared-sensing element.

6. The hermetic package according to claim 5, wherein the package has a thickness in a direction parallel to the first and second depth dimensions of the lid and the base, and the lid constitutes about one-half of the thickness of the package.

* * * * *